(12) United States Patent
Meyer

(10) Patent No.: US 6,406,212 B1
(45) Date of Patent: Jun. 18, 2002

(54) CABLE TRAY JUNCTION ASSEMBLY

(75) Inventor: J. Scott Meyer, Cordova, TN (US)

(73) Assignee: Thomas and Betts, International, Inc., Sparks, NV (US)

( * ) Notice: Subject to any disclaimer, the term of this patent is extended or adjusted under 35 U.S.C. 154(b) by 0 days.

(21) Appl. No.: 09/523,500

(22) Filed: Mar. 10, 2000

Related U.S. Application Data

(60) Provisional application No. 60/124,636, filed on Mar. 16, 1999.

(51) Int. Cl.[7] .................................................. E21F 17/02
(52) U.S. Cl. .......................... 403/170; 248/58; 248/68.1
(58) Field of Search ................................. 403/169, 170, 403/172, 188, 180, 187, 192, 194; 248/58, 698.1, 49, 72; 256/65; 52/656.9, 220.3, 220.8, 220.5

(56) References Cited

U.S. PATENT DOCUMENTS

| | | | |
|---|---|---|---|
| 5,564,658 A | | 10/1996 | Rinderer |
| 5,618,014 A | * | 4/1997 | Rinderer |
| 5,628,481 A | * | 5/1997 | Rinderer .................... 248/68.1 |
| 5,651,518 A | | 7/1997 | Rinderer |
| 5,782,439 A | * | 7/1998 | Rinderer |
| 5,792,993 A | * | 8/1998 | Rinderer |
| 5,816,011 A | * | 10/1998 | Kuramoto |
| 5,816,542 A | * | 10/1998 | Rinderer |
| 5,868,361 A | | 2/1999 | Rinderer |
| 6,032,431 A | * | 3/2000 | Sugiyama |

FOREIGN PATENT DOCUMENTS

| | | |
|---|---|---|
| WO | WO 98/24160 | 6/1998 |
| WO | 98/24160 | * 6/1998 |

OTHER PUBLICATIONS

"New Cent–R–Rail Cable Support Systems", B–line Systems, Inc., all pages.*
"Center–Lok", T and B OmniLink, p. 20.*
Thomas & Betts Corporation, *Center–Lok Modular Center–Spine Cable Tray System*, pp. 2, 20 (1998).
B–Line Systems, Inc., *New Cent–R–Rail Cable Support Systems* (1995).
B–Line Systems, Inc., *Cent–R–Rail Systems Cable Tray Systems*, pp. 2, 30 and 31 (1995).
Atlas Cable Tray Corporation, *Atlas Cable Tray*, pp. 11 and 15 (1993).
Mono–Systems, Inc., *A Revolutionary System for CABLE TRAYS*, pp. ST, 1, 7, 12 and 14 (undated).

* cited by examiner

*Primary Examiner*—Lynne H. Browne
*Assistant Examiner*—Tomlyne Malcolm
(74) *Attorney, Agent, or Firm*—Hoffman & Baron, LLP

(57) ABSTRACT

A cable tray junction assembly for attaching together a plurality of cable supporting rails including a central body having a peripherally extending vertical surface having a plurality of apertures. The central body forming a horizontal plane and having a vertical axis extending there through. The junction assembly further including a coupler for joining a cable supporting rail to the central body. The coupler including a rail connecting portion adapted to be secured to the rail and a central body connecting portion adapted to be secured to the vertical surface of the central body. The central body connecting portion including a lateral extent that engages the vertical surface such that the engagement between the lateral extent and the vertical surface resists rotation about the vertical axis.

17 Claims, 7 Drawing Sheets

CABLE TRAY JUNCTION ASSEMBLY

This application claims priority to (U.S. Provisional Application No. 60/124,636 filed on Mar. 16, 1999.

FIELD OF THE INVENTION

The present invention relates to an assembly for permitting a plurality of cable tray rail supports to be connected at a common junction.

BACKGROUND OF THE INVENTION

Runs of wires, cables and the like are typically supported in industrial environments on what is referred to as cable tray systems. One particular cable tray system includes a plurality of elongate rail sections having a plurality of rungs extending transversely from the rail section. The rungs form support surfaces over which the cables and wires may run. Such a cable tray system is described in co-pending U.S. patent application Ser. No. 09/028,370, filed on Feb. 24, 1998, the disclosure of which is incorporated by reference herewith.

In laying out the wiring for a particular application, it is common that various runs of wires and the corresponding supporting apparatus will intersect at a common point. Accordingly, cable tray systems typically include a junction connector in order to allow rails converging from different directions to meet at a central junction point.

Junction connectors of the prior art are disclosed in U.S. Pat. Nos. 5,628,481 and 5,782,439. However, such connectors have several disadvantages. These prior art designs include a plate having mounting holes extending there through extending about the edge of the plate. A connector that attaches a rail to the plate is secured to the plate by a vertically aligned fastened. While such an arrangement provides flexibility in accommodating rails approaching a junction at different angles, the fastener becomes a pivot point about which the rail can rotate about the plate. This is especially true if the fastening element is not properly tightened or if it becomes loose over time. Therefore, such designs do not adequately restrict rotation between the rail sections and the junction support. Such rail movement is undesirable since it becomes very difficult to keep the rails aligned through the junction.

The present invention overcomes the disadvantages of the prior art by providing a junction assembly that accommodates rails converging toward a junction at a variety of angles yet adequately restricts rotation between the rails and the junction.

SUMMARY OF THE INVENTION

It is an advantage of the present invention to provide a junction assembly for joining together rails converging at a common junction.

It is another advantage of the present invention to provide a junction assembly that couples the rails to a central body so that rotation on the central body is resisted.

It is a further advantage of the present invention to provide a junction assembly including a central body and a coupler for securing a rail to the central body.

It is yet a further advantage of the present invention to provide a cable tray system for supporting wires and cables including elongate rails joined at a common junction by a junction assembly including a central body and a plurality of couplers for joining converging cable supporting rails to the central body.

In the attainment of these and other advantages the present invention provides a cable tray junction assembly for attaching together a plurality of cable supporting rails including a central body having a peripherally extending vertical surface having a plurality of apertures. The central body forms a horizontal plane having a vertical axis extending there through. The junction assembly further includes a coupler for joining a cable supporting rail to the central body. The coupler includes a rail connecting portion adapted to be secured to the rail, and a central body connecting portion adapted to be secured to the vertical surface of the central body. The central body connecting portion includes a lateral extent that engages the vertical surface such that the engagement between the lateral extent and the vertical surface resists rotation about the vertical axis.

As more specifically described by way of the preferred embodiment, the central body has an annular form and the vertical surface is substantially round. The coupler rail connecting portion includes a pair of spaced side walls extending from a back wall which are adapted to engage a rail. The coupler central body connecting portion includes a flange depending from the back wall. The junction assembly further includes a plurality of fasteners for securing the couplers to the central body. Each of the plurality of fasteners extends horizontally through one of the couplers and one of the central body rim apertures.

The cable tray system for supporting wires of the present invention includes a plurality of elongate rails and a plurality of rungs extending outwardly from each of the plurality of rails. The rungs include a support surface for supporting the wires. A junction assembly is provided which including a central body and a plurality of couplers. Each of the plurality of couplers joining one of the plurality of rails to the central body. The central body has a peripherally extending rim oriented substantially perpendicular to the plurality of rails. Each of the plurality of couplers includes a central body connecting portion attachable to the rim, and a rail connecting portion adapted to be secured to one of the plurality of rails.

These and other advantages of the present invention will be appreciated from the detailed description set forth herein.

DETAILED DESCRIPTION OF PREFERRED EMBODIMENTS

Figure 1:
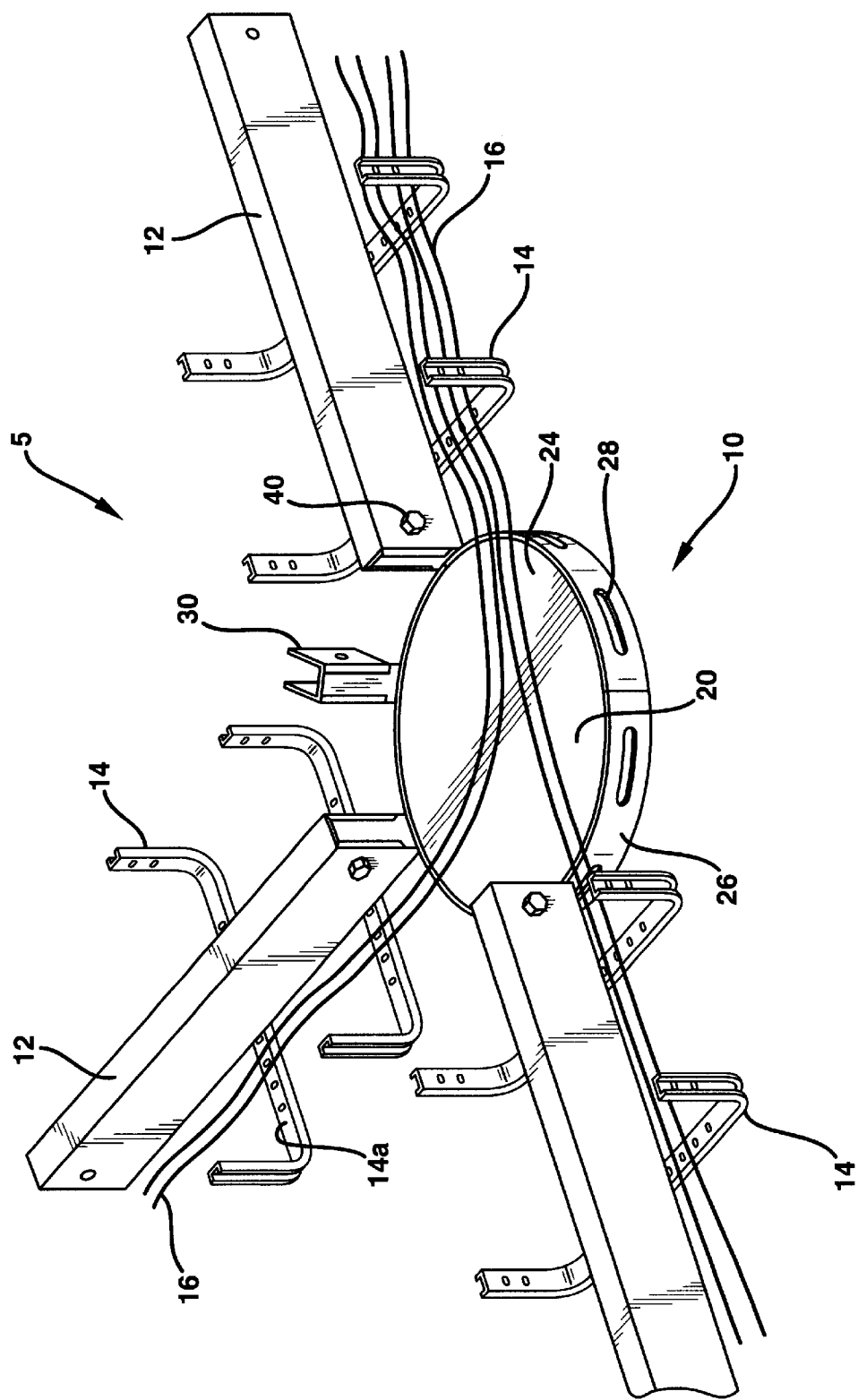
FIG. 1 is a top perspective view of the preferred embodiment of the junction assembly of the present invention.

A typical cable tray system design may require that a variety of wire runs pass through a common location. The wire runs and the related support rails may come to the common location or junction at a variety of angles. Referring to FIG. 1, the junction assembly 10 of the present invention joins together ends of the converging rail. Specifically, junction assembly 10 may be used in a cable support system 5 such as a center hung cable tray of the type described in co-pending U.S. patent application Ser. No. 09/028,370, filed on Feb. 24, 1998, the disclosure of which has been incorporated herein.

The junction assembly 10 preferably includes a rigid junction central body 20 and a junction coupler 30. Junction assembly 10 may be used to join a plurality of converging cable supporting rails 12 at a common junction. Rails 12 are elongate members having an open channel extending along the length thereof. Support rungs 14 are attachable to the rails at spaced intervals and extend laterally from the rail to which it is attached. Support rungs include a support surface 14a for supporting cables, wires and the like 16.

In the preferred embodiment, the central body 20 is a plate-like annular member having a top surface 24 peripherally bounded by a rim 26 depending therefrom, forming a tambourine-type configuration. Rim 26 forms a generally vertically extending surface depending from the horizontal surface top surface 24. The terms, vertical and horizontal, are used to describe the relative orientation between the various components of the junction assembly and elements of the cable tray system. The terms are not intended to provide a limitation with regard to a particular orientation of the junction assembly relative to the horizon. Spaced about rim 26 is a plurality of apertures 28 extending there through. These apertures 28 are preferably elongate slots extending in the peripheral direction about rim 26. Slotted apertures 28 increase the mounting flexibility of assembly 10 by permitting rails 12 to be mounted at a variety of positions about rim 26. Central body 20 is preferably formed of an electrically conductive material such as steel or aluminum. This provides the necessary rigidity and permits the cable tray system to be adequately grounded without the use of jumper straps between the various rails.

Figure 3:
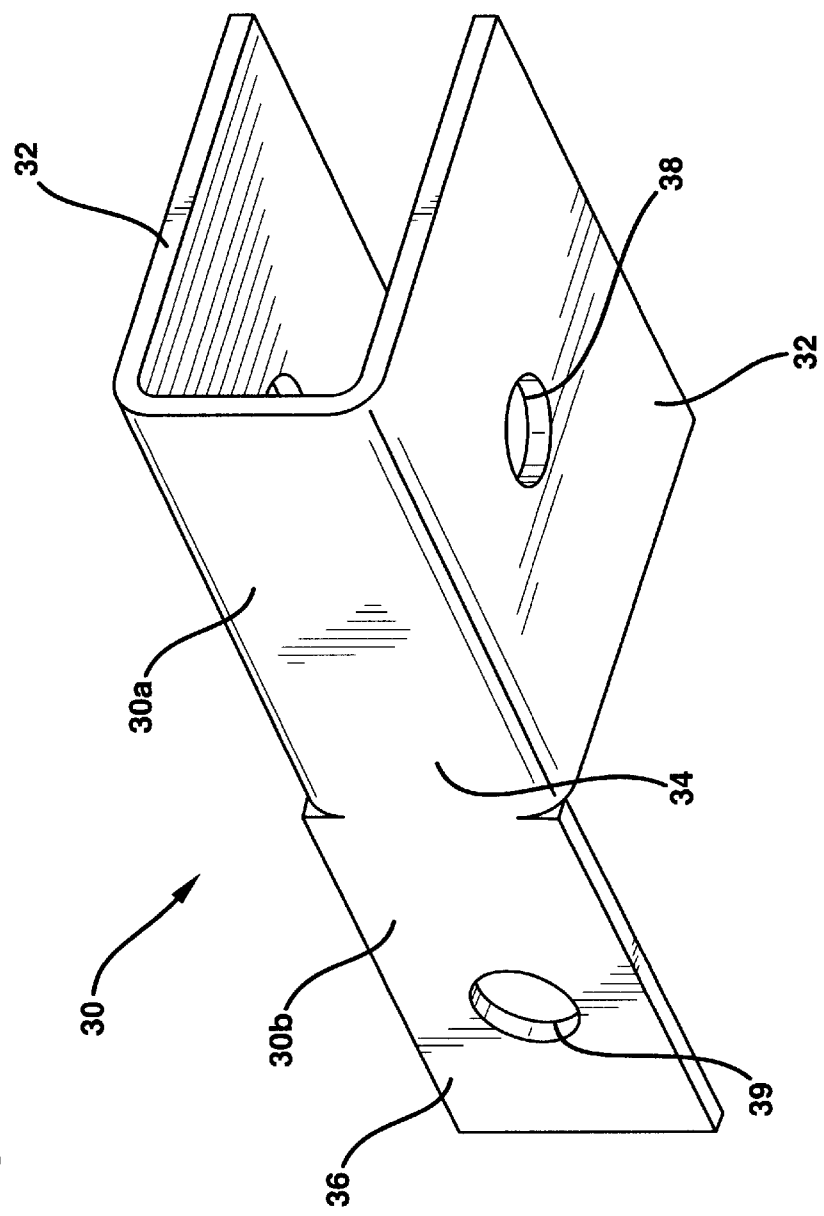
FIG. 3 is a perspective view of the junction coupler of FIG. 1.
Figure 5:
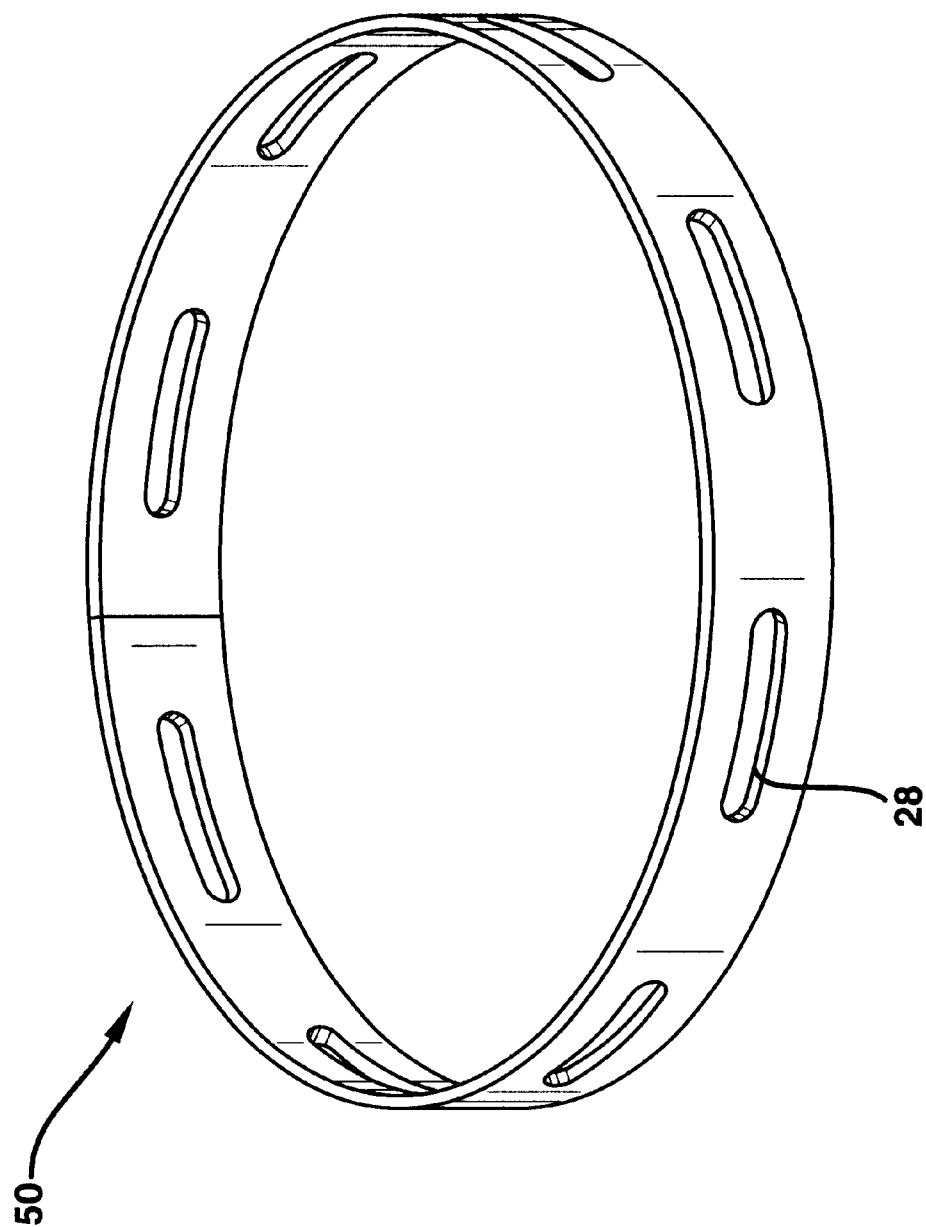
FIG. 5 is a perspective view of an alternative embodiment of the junction central body.

Rails 12 are attached to central body 20 by a rigid junction coupler 30. As shown in FIGS. 3 and 5, coupler 30 preferably includes a rail connecting portion 30a that is adapted to be secured to a rail 12 and a central body connecting portion 30b that is adapted to be secured to rim 26. Coupler rail connecting portion 30a preferably includes a pair of spaced walls 32 extending from the back wall 34. Back wall 34 includes a depending flange 36 having a lateral extent that forms coupler central body connecting portion 30b.

Attachment of coupler 30 to rail 12 may be accomplished by inserting side walls 32 within the open end portion of the rails 12. It is within the contemplation of the present invention that the configuration and size of coupler rail connection portion 30a maybe modified to correspond to the profile of a particular rail to effect a proper connection to the rail. Side walls 32 each include an aperture 38 which permits a fastening element 40, such as a bolt, to extend therethrough. Apertures 38 are positioned on side walls 32 such that when side walls 32 are inserted within a rail 12, apertures 38 align with holes formed in the walls of the rail. Therefore, the fastening element 40 can be inserted through the rails and coupler 30 to mechanically secure rail 12 to coupler 30.

In order to secure coupler 30 to central body 20, flange 36 may include a flange aperture 39 thereby permitting a fastening element, such as a nut and bolt 40, to horizontally extend through the flange aperture and one of the rim apertures 28. Coupler 30 may be aligned such that it is generally perpendicular to central body 20 and then the fastening element is tightened, thereby fixedly securing coupler 30 to central body 20.

Figure 4:
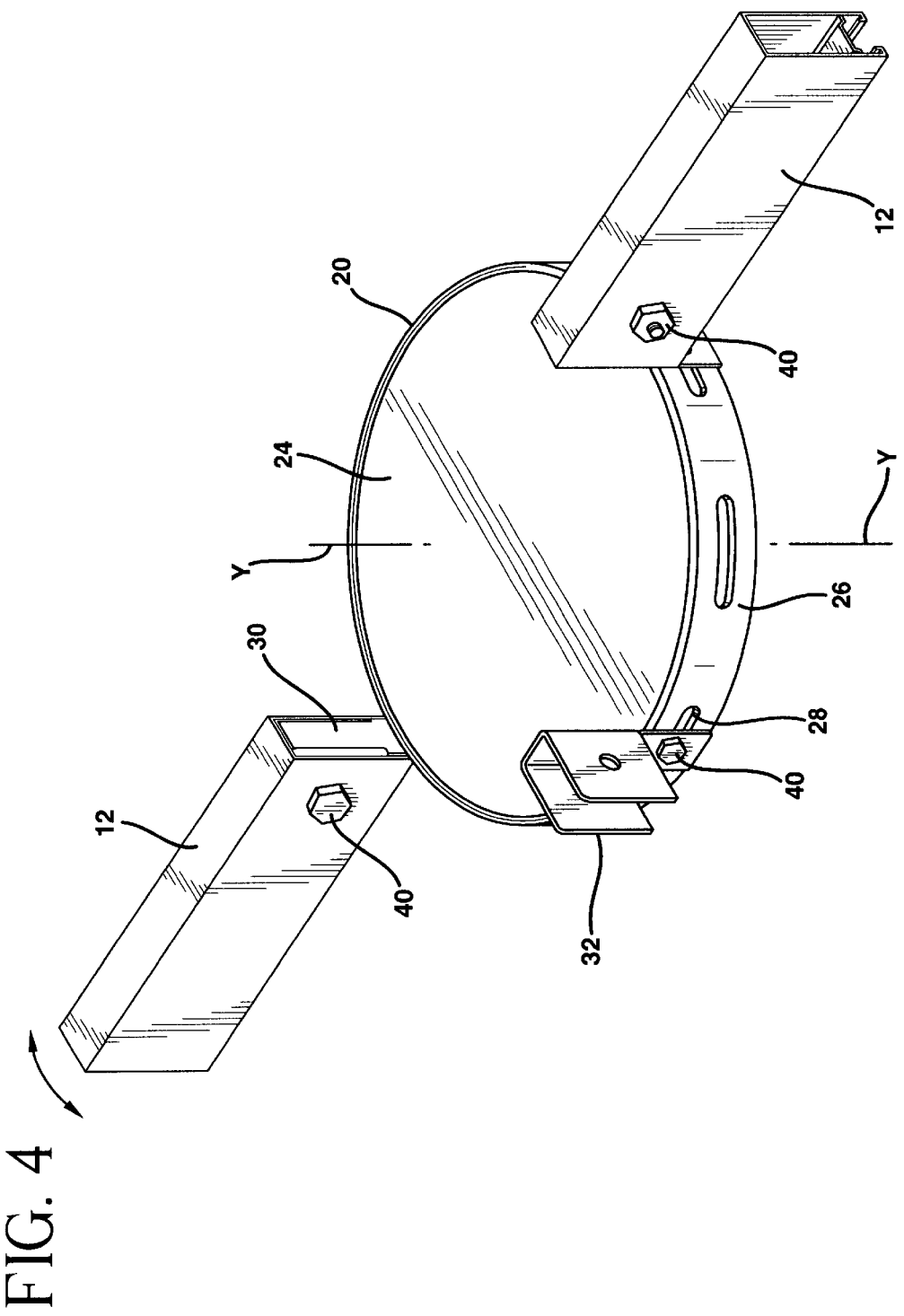
FIG. 4 is a top perspective view of the junction assembly showing the junction coupler attached to the central body of the present invention.

Upon securing coupler 30, to central body 20, flange 36 is urged against rim 26. The resulting cooperation between the lateral extent of flange 36 and vertical surface of rim 26 resists bending moments which may cause the rails 12 to pivot about a vertical axis Y-Y extending through a horizontal plane formed by central body (FIG. 4). Arrows in FIG. 4 show the resisted rail movement. Furthermore, by longitudinally aligning the fastener with the rail, the fastener does not act like a pivot point permitting the rail to rotate about axis Y-Y of the central body. Accordingly, even if the fastening element has not been adequately tightened, there will be some resistance to rotation of the rails with respect to central body 20.

In an alternatively embodiment, not shown, flange 36 may have a curvature corresponding to that of rim 26. This would ensure that a. significant portion of flange 36 would abut rim 26, thereby increasing stability in the connection between the coupler and central body.

In the preferred embodiment, the plurality of space slotted rim apertures 28 permits a plurality of couplers 30 to be located at a variety of locations about the central body 20. Each slotted aperture 28 can accommodate a coupler 30 and the coupler's position can be adjusted within the slotted aperture. When the coupler is properly positioned on the rim to accommodate the rail, the fastening element can be tightened to fix the position of the rail. Accordingly, rails 12 approaching central body 20 at nearly any angle can be connected to the junction assembly 10.

Figure 6:
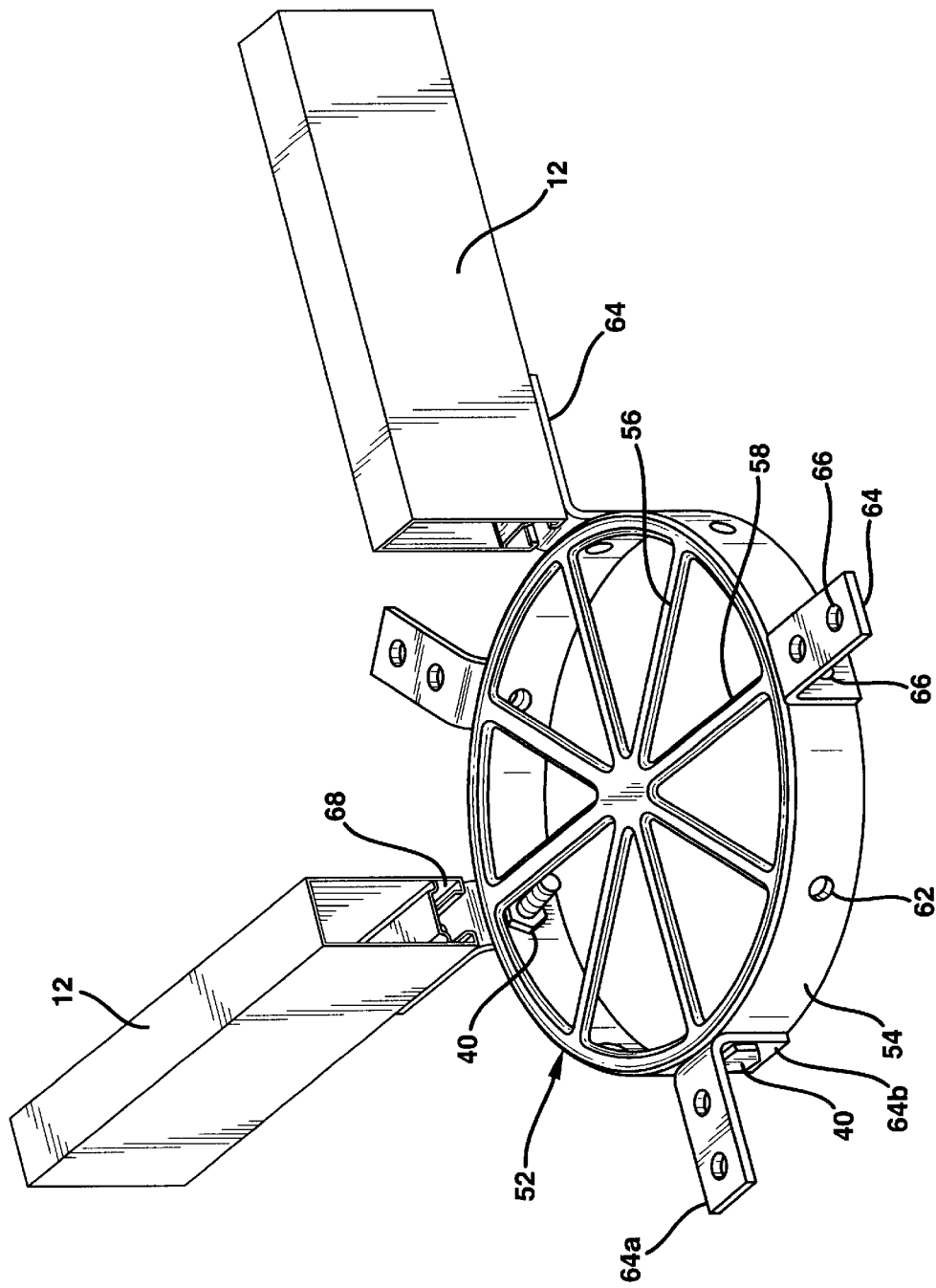
FIG. 6 is a perspective view a further alternative embodiment of the junction central body and junction coupler.
Figure 7:
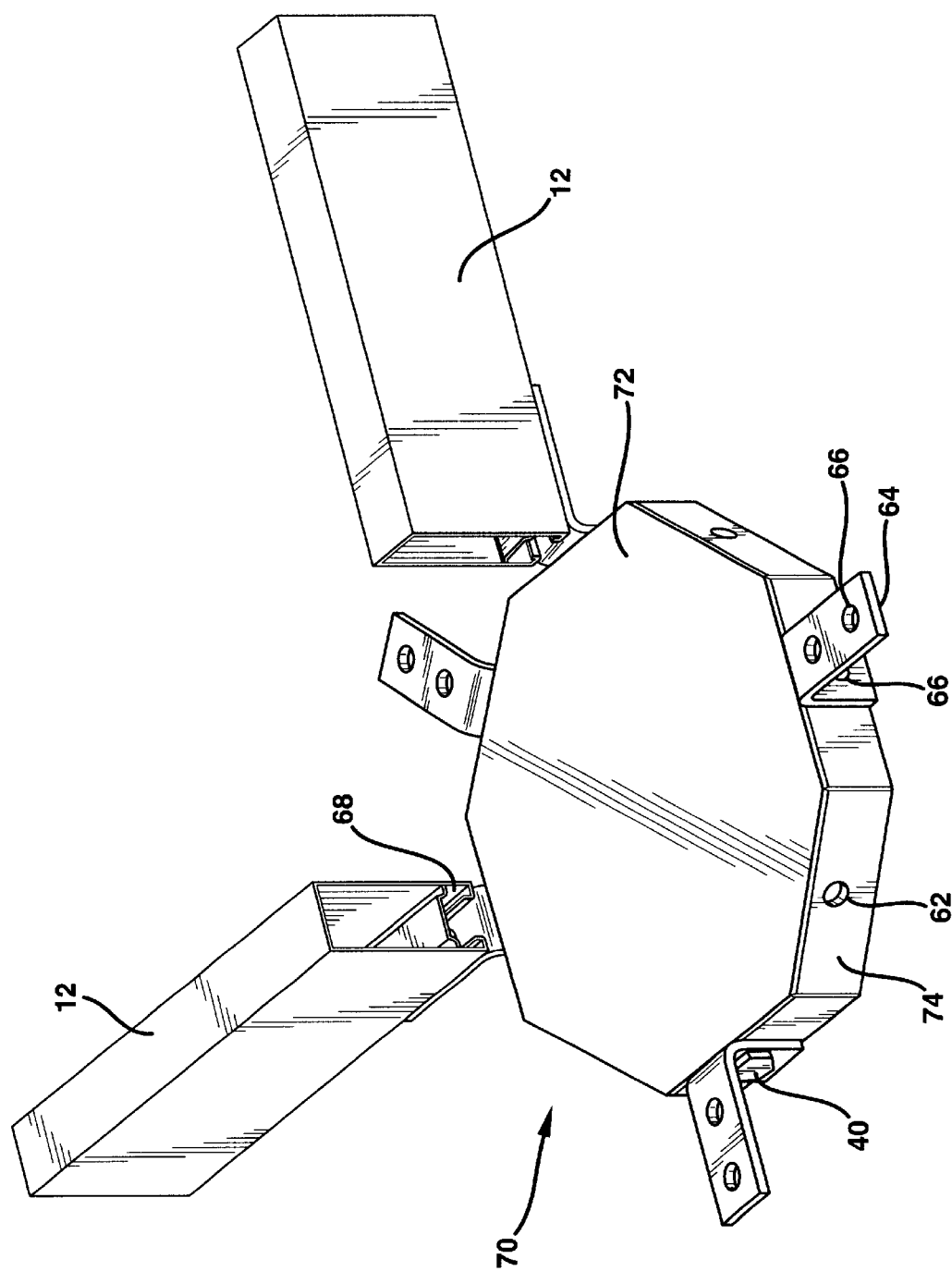
FIG. 7 is a perspective view of yet a further alternative embodiment of the junction central body of the present invention.

Alternative embodiments of the present invention are set forth in FIGS. 5 through 7.

Figure 2:
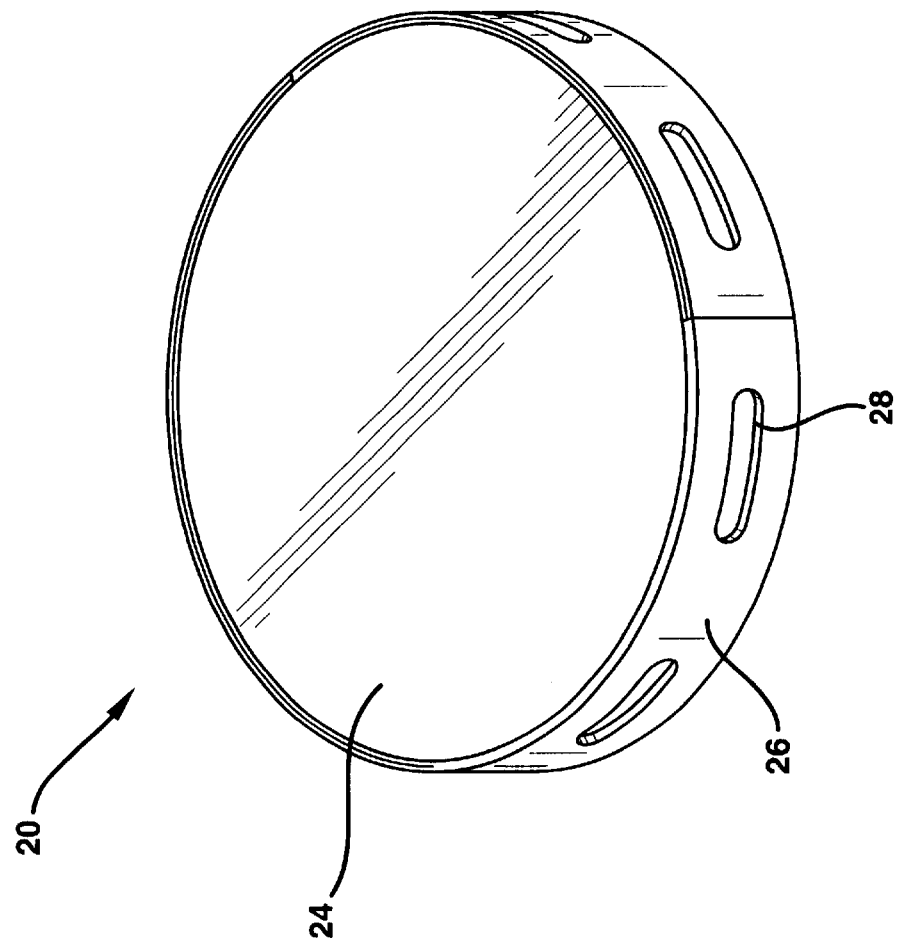
FIG. 2 is a perspective view of the junction central body of FIG. 1.

Referring to FIG. 5, central body 50 may include a rim and an open center forming a hoop-like structure. Central body, therefore, has a configuration similar to that of rim 26 of the preferred embodiment of FIG. 2. The thickness of rim 52 may be greater than that of rim 26 of the preferred embodiment in order to provide an increased rigidity of the structure. As in the preferred embodiment, rim 52 would include a plurality of peripherally extending slotted apertures 28 in order to accommodate a plurality of couplers 30.

Referring to a further alternative embodiment shown in FIG. 6, central body 52 may include an annular rim 54 that extends about and depends from a spoked hub 56. A plurality of spokes 58 radiate from a central axis 60. Rim 54 may include a plurality of apertures 62 that are essentially round through-holes to accommodate a fastening element. Alternatively, slotted apertures as set forth in the previously described embodiment could be employed.

An alternative embodiment of the junction coupler that joins the rails to the central body is shown in FIG. 6. Junction coupler 64 may include an L-shape bracket having a plurality of through holes 66 to permit the coupler to be secured to rim 54 by fastener 40 and to rails 12. In this embodiment, rails 12 are secured to coupler 64 by way of a channel nut (not shown) which is inserted within a lower channel 68 of rail 12. A bolt extends through one of the holes 66 formed in a first leg 64a of coupler 64 into the channel nut, and tightening of the bold secures the rail 12 to coupler 64. This manner of attachment is set forth in U.S. patent application Ser. No. 09/028,370, incorporated by reference herein. A second leg 64b of coupler 64 is attached to central body 52 by extending a fastener through an aperture in the second leg 64b and aperture 62 formed in rim 54.

Referring now to FIG. 7, a further alternative embodiment is shown. Junction central body 70 includes a multi-sided planar upper surface 72 having a corresponding multi-sided peripheral rim 74 depending from upper surface 72. Therefore, the vertically extending rim 74 includes a plurality of connected linear sections. Each section may included a slotted or round aperture in order to attach a coupler to central body 70. While an eight-sided body is shown, it is understood that any number of sides could be employed. Furthermore, by increasing the number of sides, the ability to accommodate rails converting at different angles is increased.

It is further within the contemplation of the present invention that the central body may be of a variety of shapes and sizes and still permit a plurality of rails to be connected at a junction. In addition, couplers 30 and 64 may be used together or separately with any of the central body embodiments disclosed.

Thus, while there had been described what are presently believed to be the preferred embodiments of the present invention, other and further modifications and changes can be made thereto without departing from the true spirit of the invention. It is intended to include all further and other modifications and changes that come within the true scope of the invention as set forth in the claims.

What is claimed:

1. A cable tray junction assembly for attaching together a plurality of cable supporting rails comprising:
   a central body having a peripherally extending vertical surface including a plurality of apertures therein, said central body forming a horizontal plane;
   a coupler for joining a cable supporting rail to said central body, said coupler including a rail connecting portion adapted to be secured to the rail and a central body connecting portion extending vertically from said rail connecting portion and adapted to be secured to said vertical surface of said central body such that said coupler supports at least a portion of the cable supporting rail vertically offset from said central body, said central body connecting portion including a lateral extent that engages the vertical surface such that the engagement between said lateral extent and said vertical surface resists rotation about said axis.

2. The junction assembly as defined in claim 1, wherein said lateral extent has an aperture formed therein adapted to receive, said fastener extending through said lateral extent aperture and said vertical surface aperture to secure said coupler to said central body.

3. The junction assembly as defined in claim 1, wherein said connector rail connecting portion includes a pair of spaced side walls extending from a back wall, said spaced side wall are adapted to engage the rail.

4. The junction assembly as defined in claim 3, wherein said connector central body connecting portion includes a flange depending from said back wall.

5. The junction assembly as defined in claim 1, wherein said coupler is a L-shaped member having a first and second leg, said first leg forming said rail connecting portion and said second leg forming said central body connecting portion.

6. The junction assembly as defined in claim 1, wherein said central body has an annular form and said vertical surface is substantially round.

7. The junction assembly as defined in claim 1, wherein said central body includes a central hub and a plurality of spokes extending from said hub to said vertical surface.

8. The junction assembly as defined in claim 1, wherein said central body includes a plurality of linear side edges.

9. The junction assembly as defined in claim 1, wherein said central body includes an annular rim surrounding a open center.

10. The junction assembly as defined in claim 1, further including a plurality of fasteners for securing said plurality of couplers to said central body, each of said plurality of fasteners extending horizontally through one of said couplers and one of said rim apertures.

11. A cable tray system for supporting wires comprising:
    a plurality of elongate rails;
    a plurality of rungs extending outwardly from each of said plurality of rails, said rungs including a support surface for supporting the wires;
    a junction assembly including a central body and a plurality of couplers each of said plurality of couplers joining one of said plurality of rails to said central body, said central body having a peripherally extending rim oriented substantially perpendicular to said plurality of rails, and
    each of said plurality of couplers including a central body connecting portion attachable to said rim, and a rail connecting portion adapted to be secured to one of said plurality of rails, and wherein said rim includes a plurality of first apertures therein and said central body connecting portion includes a flange having a second aperture therein said first and second apertures being adapted to receive a fastening element there through to secure said coupler to said central body.

12. The cable tray system as defined in claim 11, wherein said rim includes a plurality of first apertures therein and said central body connecting portion includes a flange having a second aperture therein said first and second apertures being adapted to receive a fastening element there through to secure said coupler to said central body.

13. The cable tray system as defined in claims 12, wherein said flange includes a lateral extend which engages said rim upon securement of said coupler to said central body, said flange resisting rotation of said coupler and said rail attached thereto about said central body.

14. The cable tray system as defined in claim 11, wherein each of said plurality of rails have an open end, and said rail connecting portion being receivable in said open end to facilitate attachment.

15. The cable tray system as defined in claim 11, further including a plurality of fasteners for securing said plurality of couplers to said central body, each of said plurality of fasteners extending substantially parallel to a corresponding rail and through one of said couplers and one of said rim apertures.

16. A cable tray system for supporting wires comprising:
    a plurality of elongate rails;
    a plurality of rungs extending outwardly from each of said plurality of rails, said rungs including a support surface for supporting the wires;
    a junction assembly including a central body and a plurality of couplers each of said plurality of couplers joining one of said plurality of rails to said central body, said central body having a peripherally extending vertical surface including a plurality of apertures extending there through said central body forming a horizontal plane and having a vertical axis extending there through, and each of said plurality of couplers including a rail connecting portion adapted to be secured to one of said plurality of rails and a central body connecting portion adapted to be secured to said vertical surface of said central body, said central body connecting portion including a lateral extent that engages the vertical surface such that the engagement between said lateral extent and said vertical surface resists rotation about said axis.

17. A cable tray junction assembly for attaching together a plurality of cable supporting rails comprising:

a central body having a peripherally extending vertical surface including a plurality of apertures therein, said central body having a plate member peripherally bounded by a rim depending therefrom, said plate member forming a horizontal plane and having a vertical axis extending there through;

a coupler for joining a cable supporting rail to said central body, said coupler including a rail connecting portion adapted to be secured to the rail and a central body connecting portion adapted to be secured to said vertical surface of said central body, said central body connecting portion including a lateral extent that engages the vertical surface such that the engagement between said lateral extent and said vertical surface resists rotation about said axis.

* * * * *